(12) United States Patent
Sechler

(10) Patent No.: US 6,581,494 B2
(45) Date of Patent: Jun. 24, 2003

(54) BICYCLE RIDING TRAINER

(76) Inventor: Terry L. Sechler, 708 Wyndemere, Boise, ID (US) 83702

( * ) Notice: Subject to any disclaimer, the term of this patent is extended or adjusted under 35 U.S.C. 154(b) by 0 days.

(21) Appl. No.: 09/814,562

(22) Filed: Mar. 21, 2001

(65) Prior Publication Data

US 2002/0033069 A1 Mar. 21, 2002

Related U.S. Application Data

(60) Provisional application No. 60/191,001, filed on Mar. 21, 2000.

(51) Int. Cl.[7] ............................................. G05F 1/14
(52) U.S. Cl. ................................................ 74/594.1
(58) Field of Search ............................ 74/594.1, 594.2, 74/594.3, 595, 596

(56) References Cited

U.S. PATENT DOCUMENTS

| | | | |
|---|---|---|---|
| 627,597 A | | 6/1899 | Scott |
| 846,239 A | | 3/1907 | Osborne |
| 3,870,134 A | * | 3/1975 | Anthamatten ............ 192/217.5 |
| 3,906,811 A | | 9/1975 | Thun |
| 4,171,822 A | | 10/1979 | Thun |
| 4,704,919 A | | 11/1987 | Durham |
| 4,772,252 A | * | 9/1988 | Bona ........................ 74/69 X |
| 5,067,370 A | * | 11/1991 | Lemmens .................. 74/594.2 |
| 5,363,721 A | | 11/1994 | Hsiao |
| 5,415,422 A | * | 5/1995 | Trammell, Jr. ......... 74/594.1 X |
| 5,440,950 A | | 8/1995 | Tranvoiz |
| 5,493,937 A | | 2/1996 | Edwards |
| 5,644,953 A | | 7/1997 | Leng |
| 5,718,028 A | | 2/1998 | Hasenberg |
| 5,791,203 A | | 8/1998 | Chen |
| 5,924,336 A | | 7/1999 | Richardson |
| 5,941,135 A | * | 8/1999 | Schlanger .................. 74/594.1 |

* cited by examiner

Primary Examiner—Christopher P. Schwartz
Assistant Examiner—Melanie Torres
(74) Attorney, Agent, or Firm—Pedersen & Co., PLLC; Ken J. Pedersen; Barbara S. Pedersen

(57) ABSTRACT

Embodiments of a bicycle riding training system are disclosed. The system includes a crank assembly that is removable from the bicycle without disruption of the sprocket and chain. The invented system comprises coaxial shafts that rotate preferably together in a hub bearing assembly. The coaxial shafts preferably include an external shaft within the bearing retainer cups of a bicycle frame bottom hub assembly and an internal shaft that connects to the crank arms. The internal shaft preferably is made of two parts that connect at a midpoint within the external shaft using a bolt, screw or other connector. Removing the connector permits withdrawal of the internal shaft while leaving the external shaft and sprocket assembly intact. An additional feature of the connector in the internal shaft is that it may serve to expand or otherwise tighten the internal shaft inside the external shaft, and thereby fix the internal shaft to the external shaft. With the invented removable shaft system, the external shaft, sprocket and chain remain in place when the crank arms and pedals on the internal shaft, for training purposes.

12 Claims, 12 Drawing Sheets

INTERNAL SHAFT

LEFT CRANK ARM
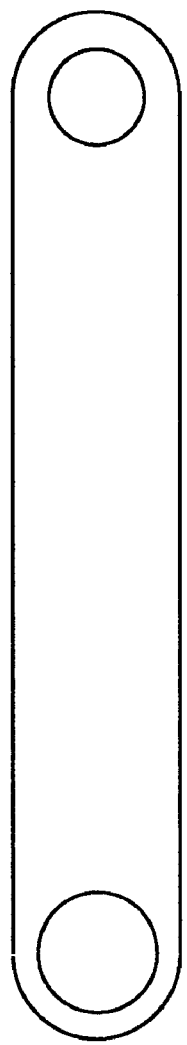
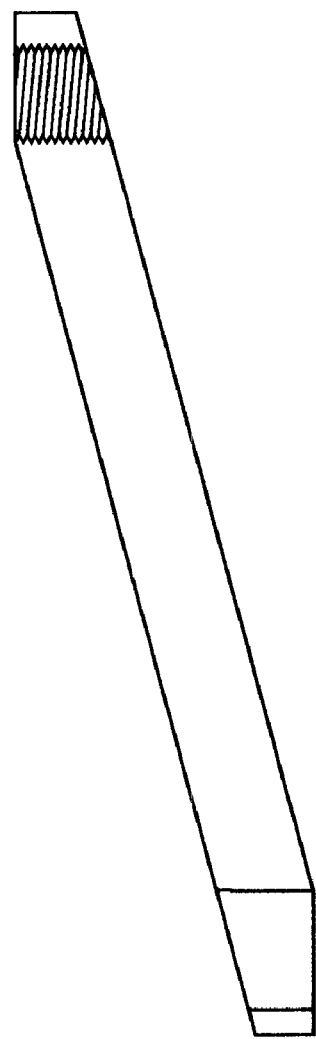
FIG. 6B     FIG. 6A

RIGHT CRANK ARM
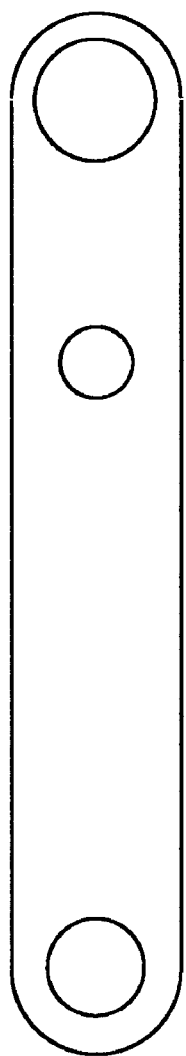 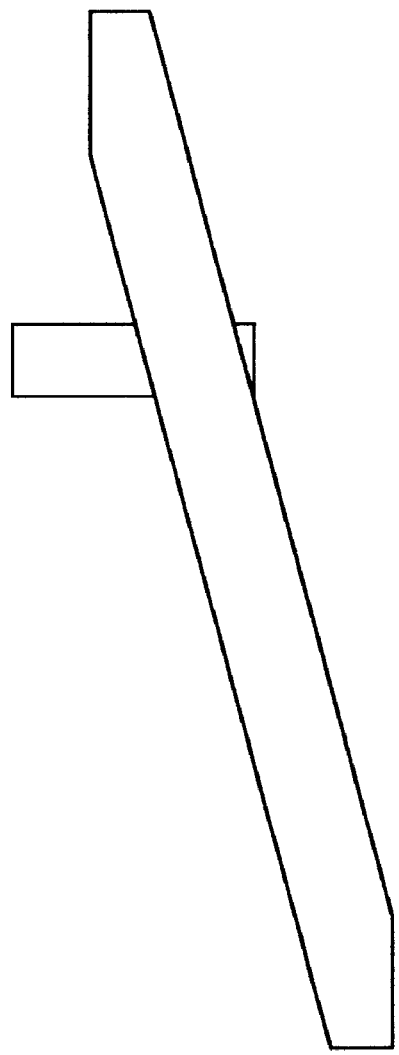
FIG. 7B     FIG. 7A

INSERT ASSEMBLED RIGHT CRANK ARM/INTERNAL SHAFT

INSERT ASSEMBLED LEFT CRANK ARM/INTERNAL SHAFT

BICYCLE RIDING TRAINER

DESCRIPTION

This application claims priority of my prior, co-pending provisional application, Ser. No. 60/191,001, filed Mar. 21, 2000, which is herein incorporated by this reference.

BACKGROUND OF THE INVENTION

1. Field of the Invention

The invention generally relates to bicycle or velocipede training equipment. More specifically, this invention relates to a bicycle crank set with removable crank arms and pedals for training purposes that does not alter the sprocket or chain assembly.

2. Related Art

Scottish blacksmith Kirkpatrick Macmillan produced a crude version of today's modem bicycle by in the mid 19th century. This bicycle had a steering mechanism and a cranking mechanism comprising pedals connected by a rod within the rear wheel. Over the years, various improvements have added to Macmillan's crank design including:

Scott (U.S. Pat. No. 627,597) revealed a MEANS FOR ATTACHING SPROCKET WHEELS TO CRANK-SHAFTS in 1898. The design interlocks a sprocket with a single-piece bicycle crankshaft for use of a chain drive mechanism.

Osborne (U.S. Pat. No. 846,239) discusses a CRANK HANGER with inwardly hanging shaft-sections wherein one shaft-has a tapered end and another has a tapered recess to receive the tapered end. One crank arm has threads for screwing on the sprocket.

Thun (U.S. Pat. No. 3,906,811) VELOCIPEDE TREAD CRANK and Thun (U.S. Pat. No. 4,171,822) DUAL PEDAL CRANK ASSEMBLY FOR BICYCLES both depict two-piece bicycle crank arms that thread upon each other on the side of the bicycle extending away from the sprocket.

The LIGHT-WEIGHT BICYCLE CRANKSHAFT ASSEMBLY UTILIZING TWO-PIECE AXLE INTEGRALLY JOINED TO CRANK ARMS proposed by Edwards (U.S. Pat. No. 5,493,937) comprises two integrally attached hollow crank arms one with a male head member and another with a female receptacle. Schlangei (U.S. Pat. No. 5,941,135) is also a BICYCLE CRANKSHAFT ASSEMBLY that also connects two portions of a crank axle to one another in a similar fashion.

Richardson (U.S. Pat. No. 5,924,336) describes a HOLLOW BICYCLE CRANKSHAFT where one axle shaft member matingly engages a second axle shaft member and housed within a tubular housing member that secures the assembly in a coaxial and concentric alignment.

These improvements benefit riding efficiency. On the other hand, tools for learning how to ride a bike have seen few improvements:

Training wheels are the staple learning tool of youngsters and adults. While useful, many young children do not have the strength to operate a bicycle using the pedals and require pedal removal to propel the bicycle under foot power. This removal helps prevent the child's shins from striking the pedal mechanism, but still leaves the crank arms in place, which can strike the child's shins or cause the child to get "tangled up" in the crank arms and fall.

Stringer (U.S. Pat. No. 5,315,896) portrays a QUICK RELEASE BICYCLE PEDAL that addresses this method with a push button mechanism along the pedal's lateral axis at the outermost portion from the bicycle frame itself. Similarly, Lin (U.S. Pat. 5,586,472) displays a DETACHABLE BICYCLE PEDAL MOUNTING STRUCTURE with a quick release mechanism along the longitudinal axis located at the area where the pedal connects with the crank arm.

Conventional systems for training children to ride bicycles have not fully addressed injuries that individuals sustain while learning to ride a bicycle using non-pedal foot power. For example, Stringer and Lin remove pedals. Yet, the crank arms remain on the bicycle and may still impact the learner's shins and increase chances of a fall.

Still, there is a need for a device that overcomes many of the deficiencies of the prior art by providing a strong crank assembly that can be removed while leaving the bicycle chain and sprocket in place. There is a need for crank arms and pedals that are easily-removed without having to remove or move the hub assembly or chain assembly. There is a need for such a device that is economical and durable.

BRIEF SUMMARY OF THE INVENTION

The invention comprises a system for convenient removal of pedals and crank arms from a bicycle for operation of the bicycle by foot-power, for example. The invented system provides a sturdy and stable crank set for normal bicycle operation, which crank set may be removed with a common tool(s) when the crank arms and/or pedals will be in a person's way. Preferably, the invented system comprises a shaft-within-a-shaft system, including an internal shaft that is easily removable from the bicycle and that takes with it the crank arms. The shaft-within-a shaft system preferably includes: 1) an external shaft that is rotatably contained in the hub assembly in contact with the bearings and fixedly connected to the sprocket, and 2) a removable internal shaft that is connected to the crank arms, and which, when installed for use, is inside, generally coaxial with, and frictionally fixed to, the external shaft.

The preferred external shaft is disposed within the bearing retainer cups of a bicycle frame bottom hub assembly, and cooperates with a sprocket or spider assembly. The external shaft is fixedly connected to the sprocket/spider assembly preferably at one of its ends.

The internal shaft-crank arm combination is installed through the external shaft in such a way that preferably tightens the internal shaft tightly inside the external shaft by frictional engagement. Preferably, this is done by the internal shaft being in two parts, which each hold a crank arm and which each enter the external shaft from opposite ends. The two parts are connected preferably by a fastener, such as a bolt, screw, or other preferably-single fastener that secures the two internal shaft portions together inside the external shaft, generally at a midpoint along the combined internal shaft. Preferably, the internal shaft two portions are inserted into the external shaft from opposite ends of the shaft and connect together near the middle of the external shaft so that the resulting, installed combination is sturdy and reliable. The preferred single bole both fixes the two internal shaft parts to each other and causes the internal shaft to tighten its frictional engagement with the inside surface of the external shaft. For removal of the internal shaft and crank arms, the bolt may be removed from the internal shaft, which loosens the internal shaft relative to the external shaft and allows the two parts of the internal shaft to come apart and be pulled out from opposite ends of the external shaft. Thus, the internal shaft and its crank arms and pedals are removed, while leaving the external shaft and sprocket assembly intact.

BRIEF DESCRIPTION OF THE DRAWINGS

FIG. 2a is a cross sectional view of one embodiment of the invention's external shaft.

FIG. 2b illustrates an embodiment of a lock nut that may be installed on the distal end of the external shaft of FIG. 2a.

FIG. 2c is a right end view of the external shaft of FIG. 2a.

FIGS. 6a and 6b are a front view and side view, respectively, of a left crank arm according to one embodiment of the invention.

FIGS. 7a and 7b are a front view and side view, respectively, of a right crank arm according to one embodiment of the invention.

DETAILED DESCRIPTION OF THE INVENTION

Figure 1:
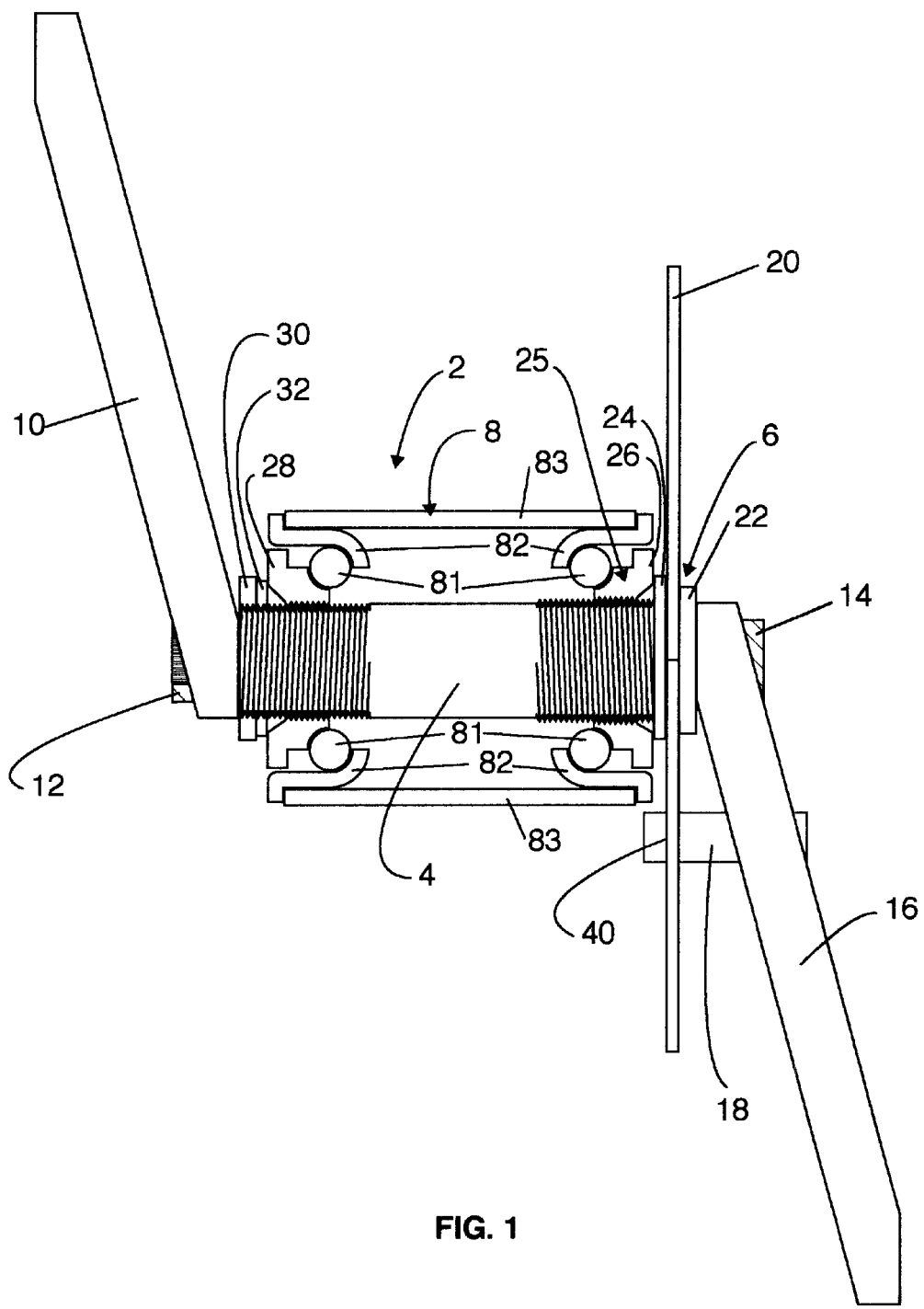
FIG. 1 is a schematic, cross sectional view of one embodiment of the invention, assembled in a bicycle.
Figure 2:
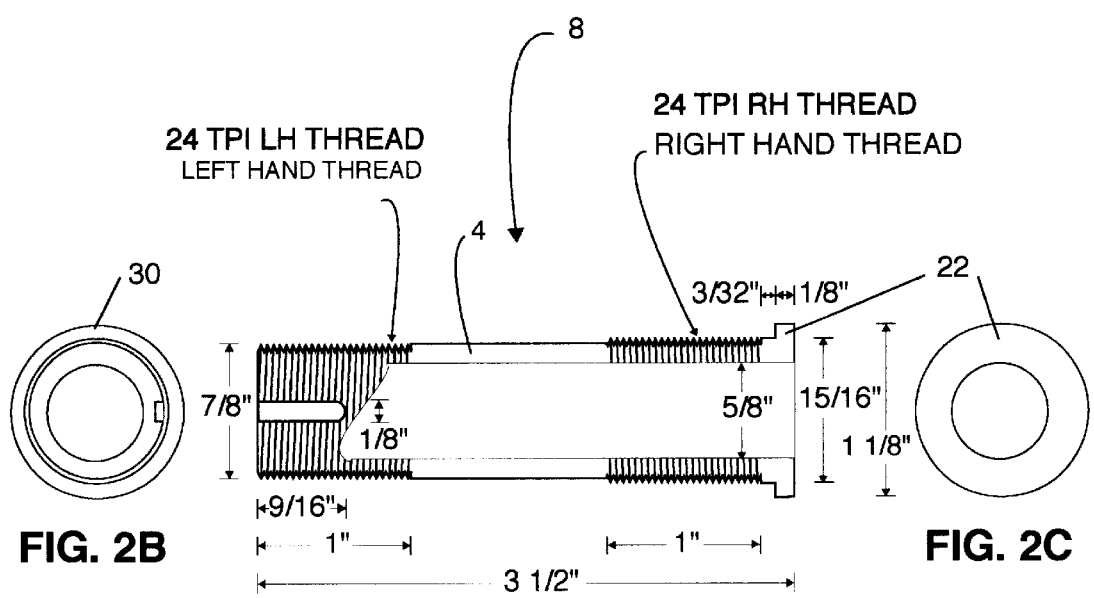

Referring to the Figures, there is shown one, but not the only, embodiment of the invention. FIG. 1 shows the preferred embodiment of one embodiment of the invented bicycle riding training system (2), in fully assembled form, but not showing pedals at the end of the crank arms. FIGS. 2–12 illustrate pieces-parts of the preferred system (2), assembly of the system (2), and, therefore, disassembly of the system (2) for use of the bicycle for training purposes. When the bicycle is being used by a beginner rider, the system (2) may easily be removed, and, once the rider is more adept and wants/needs to try riding with pedals, the system (2) may be quickly and securely added to restore the crank arms with their pedals.

External shaft (4), with sprocket attachment (6), rests within the bicycle bottom hub assembly (8). Left crank arm (10) connects to the left shaft portion (12) of the preferably-two-portion internal shaft. Un-threaded bore (34) in left internal shaft portion (12) receives bolt (38), and the threaded bolt end extends into the right internal shaft portion (14) to engage with female threaded bore (36). The two portions of the internal shaft connect preferably at a "medial" point in the external shaft (4), that is, generally midway along the longitudinal axis of the external shaft.

When the two portions (12, 14) are tightened together, the slanted (angled) inner end surfaces (112, 114) of the portions (12, 14) meet. The bore (34) in the left portion (12) is not threaded to the bolt and is larger in diameter than the bolt, which allows the left portion (12) to slide slightly radially relative to the bolt and to slide slightly radially relative to the right portion (14). When the bolt is tightened, therefore, the left portion (12) slides slightly, which causes the edges (212 and 214) to move outward towards the interior surface of the external shaft, in effect, increasing the outer diameter of the internal shaft. Before tightening, the internal shaft already preferably forms a fairly tight fit with the external shaft, but the tightening of the bolt causes the internal shaft to grip and frictionally engage the interior surface of the external shaft to an even greater extent. This, in effect, fixes the internal shaft to the external shaft.

Right internal shaft portion (14) connects with right crank arm (16) with its chain ring indicator pin (18) to translate the "pedal power" from the foot pedals (not shown) to the crank arms to sprocket (20). During assembly of the system (2), the chain ring indicator pin (18) freely slides into a receiving aperture (40) and removes from the sprocket without effort when disassembling the internal shaft assembly, thus, leaving the sprocket assembly in its original position. The proximal ends of the crank arms are affixed to their respective internal shaft portions, by various means. For example, the right crank arm and left crank arm may be integral molded or formed with their respective right and left internal shaft portions. Or, the right crank arm and left crank arm may be made separately, as suggested in the drawings, and joined to the right and left internal shaft portions, respectively, by the manufacturer or by the assembler or owner. For example, welded, threaded, quick-release, or other attachment mechanisms may be used to securely and rigidly connect the crank arms to their respective portions of the internal shaft.

While they are not shown in the Figures, it is understood that foot pedals are preferably mounted to the distal ends of the crank arms, by various means. For example, welding, threading, quick release, or other connection mechanisms may be used.

Figure 4:
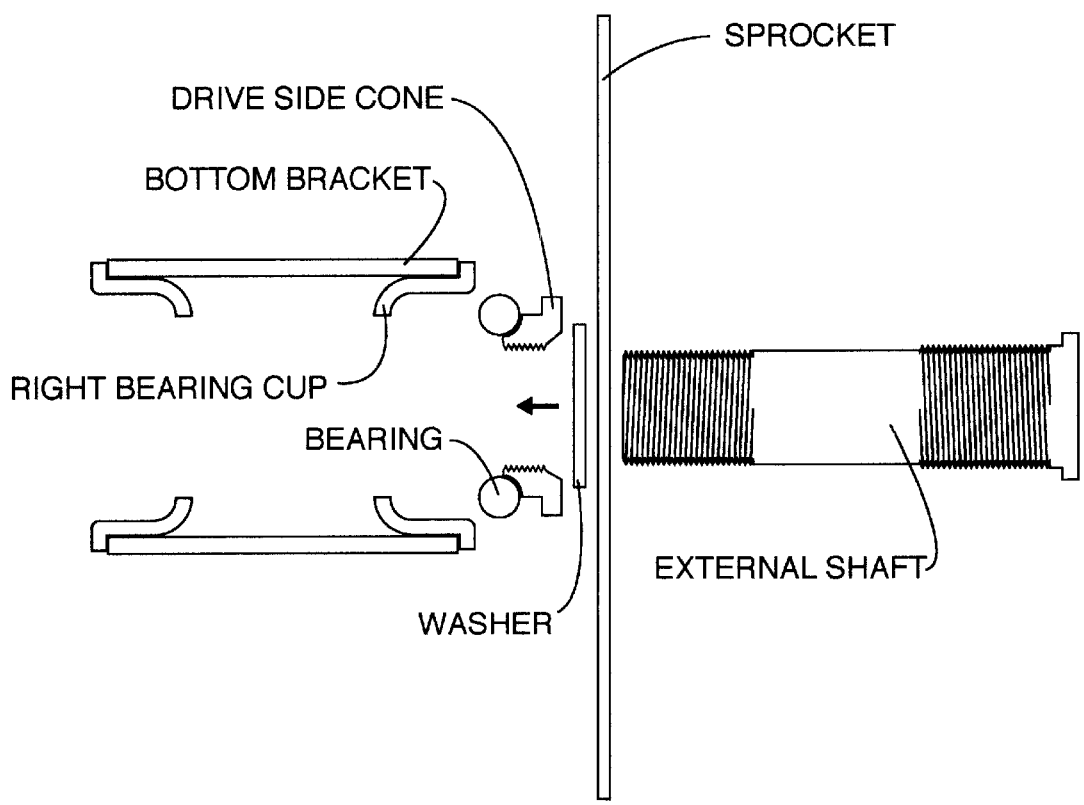
FIG. 4 is a partial exploded view of the embodiment of FIGS. 1–3, showing the external shaft in position for installation through the sprocket and into the bottom bracket and bearing cup system of the bicycle hub.
Figure 5:
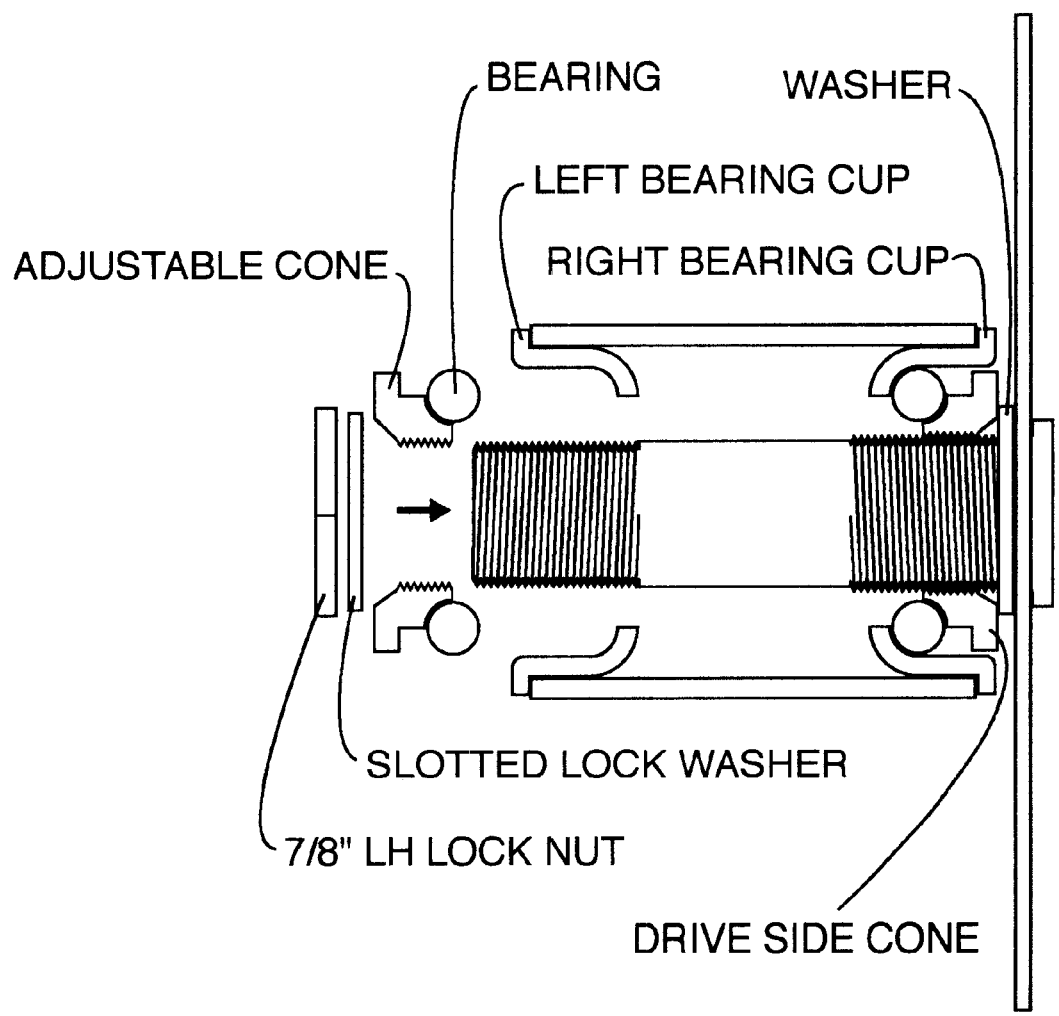
FIG. 5 is an exploded view of the embodiment of FIGS. 1–4, wherein the lock system for the external shaft is in position for securing the external shaft in the bicycle hub.
Figure 8:
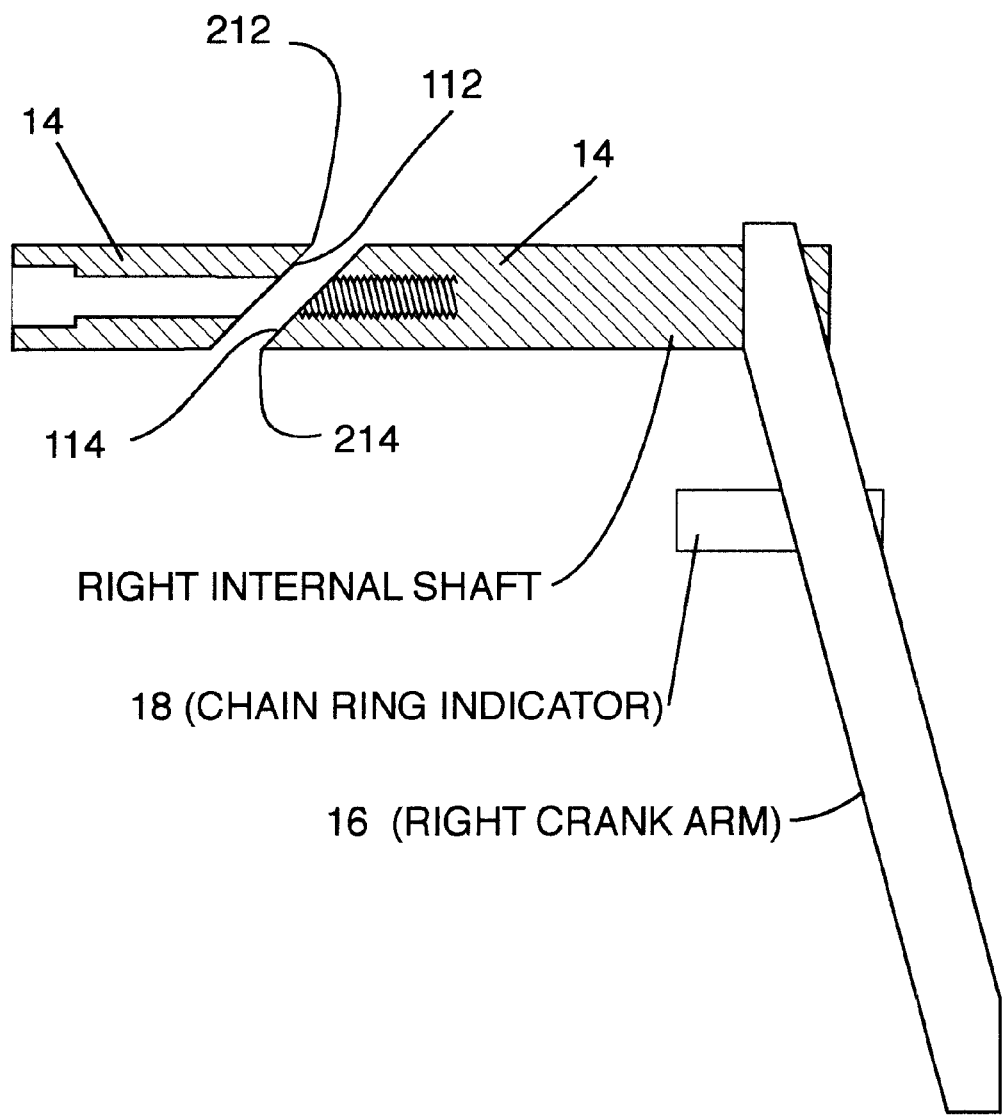
FIG. 8 is a front view of the internal shaft and right crank arm joined together according to one embodiment of the invention.
Figure 9:
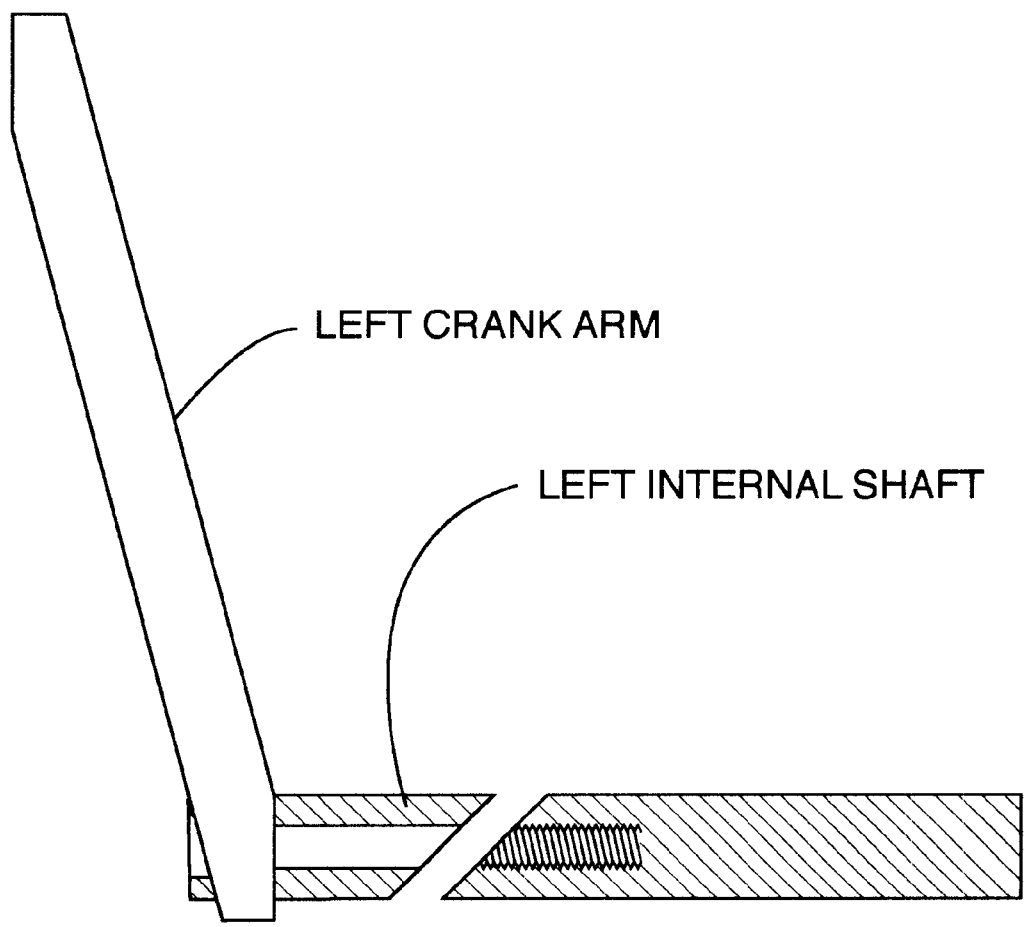
FIG. 9 is a front view of internal shaft and left crank arm joined together according to one embodiment of the invention.

Hub assembly (8), and how external shaft (4) is secured in the hub assembly, are illustrated in FIGS. 4 and 5. External shaft (4) has right hand threads on its proximal end and left hand threads on its distal end. External shaft (4) extends through the sprocket, through washer (24), and through the bearings (81), bearing cups (82), and hub brackets (83) ("bottom bracket" as described in FIG. 4). Internally-threaded drive side cone (26) is tightened on the external shaft proximal end, and internally-threaded adjustable cone (28) is tightened on the external shaft distal end. Slotted lock washer (32) and lock nut (30) are installed on the distal end of the external shaft (4) to secure the hub-external shaft assembly. Thus, one may see that right stop (22), and washer (24) and drive side cone (26) (which washer and drive side cone may be called "a left stop 25"), form the limiting structure on both sides of the sprocket to maintain sprocket securement and proper movement. In this embodiment, the sprocket rests between the washer and right stop. In other embodiments, the sprocket may be molded to the right stop, drive side cone or external shaft, for example. In the preferred embodiment, internally-threaded left adjustable cone (28) and lock nut (30) combine with slotted lock washer (32) to secure the external shaft assembly within the bicycle bearing cups.

During assembly, left internal shaft portion (12) passes through left side (distal end) of the external shaft (4) and the right internal shaft portion (14) passes through the right side (proximal end) of the external shaft. Once brought together, and tightened inside the external shaft, for example, as described above by the relative movement of the angled end surfaces of the portions (12, 14), the left and right internal shaft portions form a solid and rigid unit coaxial with and engaged with the external shaft, forming a secure and complete crank assembly for propelling the bicycle under pedal power. The fixed relationship of the internal shaft to the external shaft may further provide a means for transmission of power from the crank to the sprocket, that is, from crank arms to internal shaft, from internal shaft to the external shaft and from external shaft to the sprocket at the attachment (6). In other words, therefore, during pedaling, the crank arms may power the internal shaft, which, because the internal shaft and external shaft preferably rotate together, this may power movement of the external shaft and the sprocket around the axis of rotation.

Figure 3:
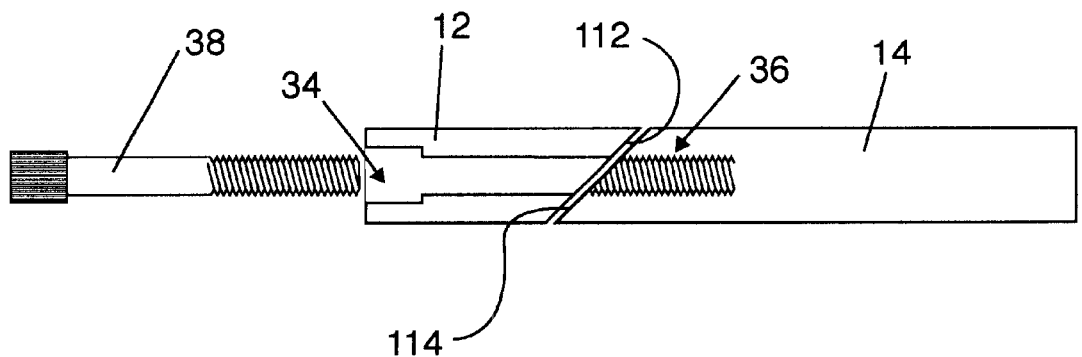
FIG. 3 is a cross sectional view of one embodiment of the invented three-piece internal shaft system, including two internal shaft portions and a fastener that connects the two internal shaft portions.

The preferred internal shaft portions are illustrated in FIG. 3. Left internal shaft portion (12) has bore (34) extending all the way longitudinally through the portion (12), and right internal shaft portion (14) has female threaded bore (36) extending longitudinally part of the way into the portion (14). In this embodiment, the bolt (38) which connects the two internal shaft portions, is about as long as, and extends into the internal shaft portions to reach, midway along the internal shaft (12 plus 14).

Alternate connection means for connecting the two inner shaft portions together may be used, for example, a quick connect and disconnect assembly wherein a low pressure spring-loaded pin replaces the bolt. Preferably, whatever connection means is used, it causes the two inner shaft portions to be joined together in a sturdy, non-wobbling, non-bending way, so that, once the internal shaft is tightened in the external shaft, the two shaft portions do not move or bend relative to each other and do not move relative to the external shaft. While other systems may be used to tighten the internal shaft to the external shaft, the preferred system is involves the left internal shaft and right internal shaft contacting each other at their inner surfaces at about a 45 degree angle, to provide the frictional engagement with the external shaft discussed above. The outer diameter of the preferred internal shaft portions is sized close to the inner diameter of the external shaft, so that the internal shaft portions slide inside the external shaft easily and smoothly, but with little room for movement of the internal shaft relative to the external shaft except the slight radial movement caused by tightening of the bolt to move the edges (212, 214) out against the external shaft.

Internal and external shaft manufacture may utilize stamping, forging, injection, welding, molding and/or machining process techniques. Utilizing carbon fiber or similar lightweight high-strength materials with pre-molded or cut-out threading will address the weight concerns of bicycle racers and avid enthusiasts. For example: Internal shaft portions may be forged/welded to the crank arms. Female threading may be part of the mold or machined using appropriate dies. In addition, molding may combine the sprocket, right stop, washer and drive side cone of the external shaft system into one unit.

Also, the inventor envisions that the internal shaft and fastener/bolt system may be adapted so that the fastener/bolt enters the internal shaft from the right end, that is, through the end of the internal shaft that slides through the sprocket. This and other adaptations may be made within the scope of the invention.

The sprocket assembly also may be made by various techniques, as will be appreciated by one of skill in the bicycle art. It may be stamped or forged before external shaft attachment using threading, pins or bolts. In fact, the whole external shaft and sprocket assembly could be molded as one individual unit to produce a bottom hub assembly including external shaft, sprocket and bearing assembly.

Figure 10:
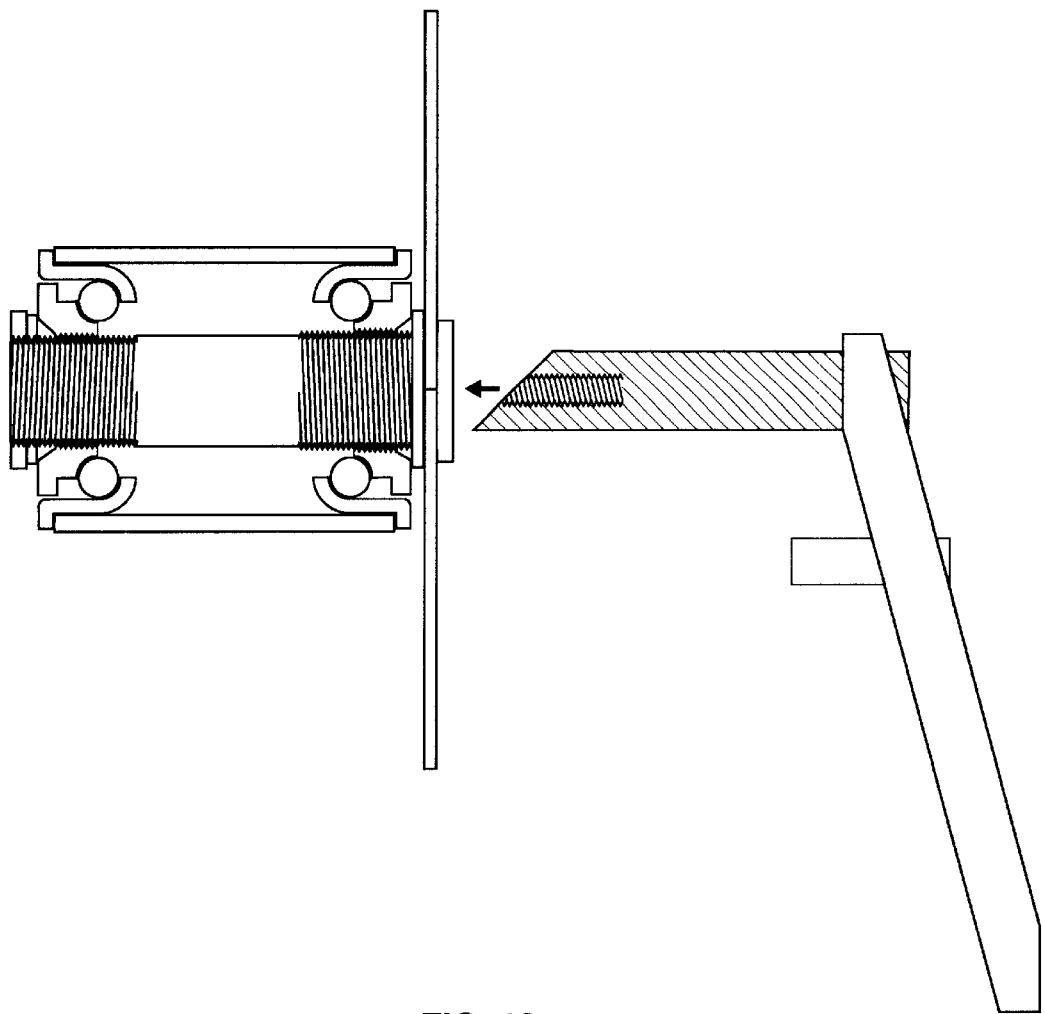
FIG. 10 illustrates the internal-shaft-portion-right-crank-arm combination of FIG. 8 being inserted into the external shaft in the bicycle frame bottom hub assembly.
Figure 11:
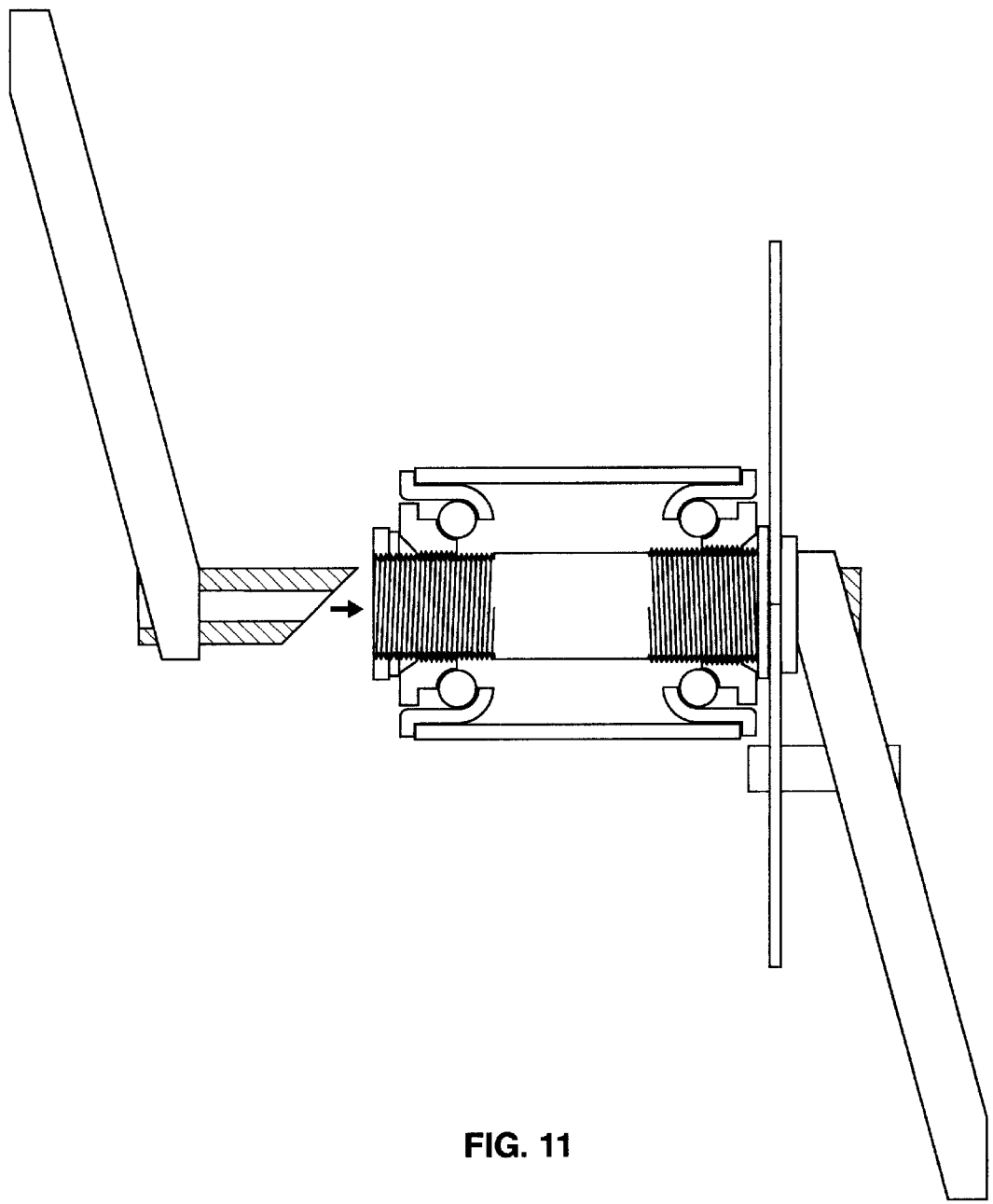
FIG. 11 illustrates insertion of the internal-shaft-portion-left-crank-arm combination into the external shaft in the bicycle frame bottom hub assembly.
Figure 12:
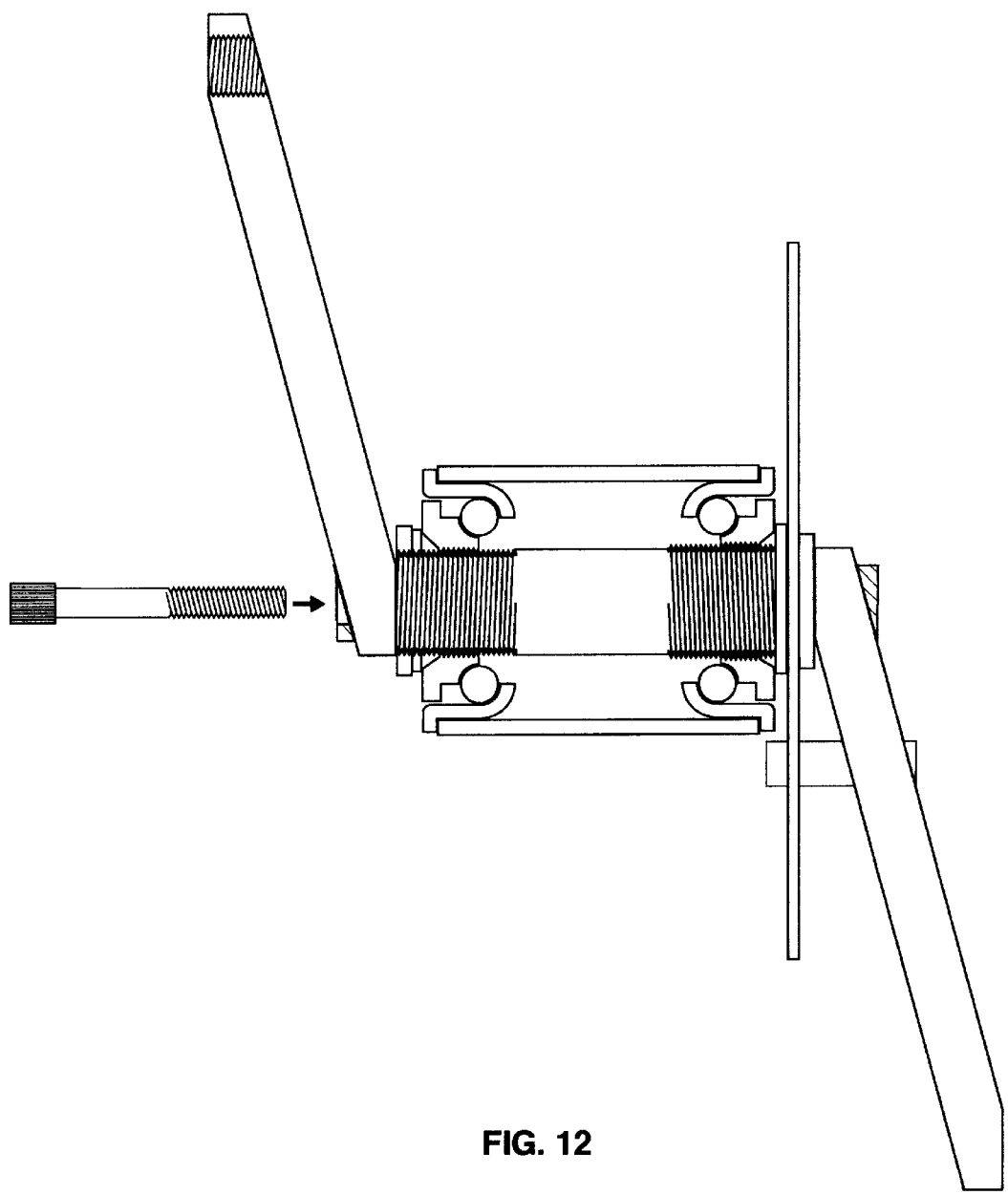
FIG. 12 illustrates insertion of the bolt fastener into the internal shaft for connection of the two internal shaft portions inside the external shaft, and for increasing frictional engagement of the internal shaft with the external shaft.

FIGS. 4 through 9 illustrate the pieces-parts of one embodiment of the system (2), and FIGS. 10–12 illustrate relative position and assembly of the pieces-parts. From these drawings, it is clear how the system (2) is disassembled when the user, parent, or trainer wishes to remove the crank arms and pedals. Once the hub assembly, sprocket, and external shaft are secured in place, these components typically stay in place, during use of the bicycle either in conventional mode or in training mode without the crank and pedal system, and the internal,shaft system that serves as the means to connect the crank and pedal system to the bicycle.

Disassembly is done generally in reverse of assembly. The bolt (38) is loosened and removed, which loosens the internal shaft portions relative to the interior surface of the external shaft, and allows the two internal shaft portions to come apart. Each of the internal shaft portions are pulled out of an end of the external shaft, carrying their crank arms and pedals with them. Removing the internal shaft connector (bolt 38), therefore, permits withdrawal of the internal shaft and crank arms, so that the bicycle may only be propelled under foot power. In this disassembled configuration, the rider's feet may touch the ground in unison and may propel the bicycle without danger of being tangled/hit by crank arms or pedals. By propelling the bicycle, and then practicing raising a foot, or feet, above the ground, the user rapidly develops balance and confidence. In addition, whereas training wheels are an all or nothing proposition, whereas the current invention allows users to choose their own learning pace/regime by changing the amount of time the user's feet touch the ground and how much time the user's feet are raised up.

Discussion of this invention referenced particular means, materials and embodiments elaborating limited application of the claimed invention. The invention is not limited to these particulars and applies to all equivalents within the following claims.

What is claimed is:

1. A bicycle crank system comprising:
   an external shaft supported in a bicycle hub and fixed to a sprocket cooperating with a bicycle chain; and
   an internal shaft disposed within the external shaft, wherein the internal shaft holds right and left crank arms and is removable from the external shaft without disruption of the sprocket and chain, and wherein the internal shaft comprises two portions inserted into two opposite ends of the external shaft and comprises a fastener that slides through one of said two portions and connects to the other of said two portions to connect said two portions together;
   wherein said two portions have angled inner end surfaces which abut each other and slide radially relative to each other when the fastener tightens into said two portions, to cause said two portions to frictionally engage with the external shaft.

2. A bicycle crank system comprising a shaft-within-a-shaft system comprising:
  an external shaft for being supported in a bicycle hub, the external shaft fixed to a sprocket which is for cooperating with a bicycle chain; and
  an internal shaft secured within and coaxial with the external shaft;
  right and left crank arms connected to two ends of the internal shaft;
  wherein the internal shaft comprises a plurality of parts that are detachable from each other upon removal of a fastener accessible from outside the external shaft, wherein the internal shaft parts detach from each other to slide out from the external shaft for removal of crank arms from a bicycle without disruption of the sprocket and chain;
  wherein the fastener is a single bolt coaxial with the internal shaft and connecting the plurality of parts of the internal shaft;
  wherein there are two of said plurality of parts, and the bolt is threaded on one end and only threads to one of the two parts;
  wherein the bolt passes through a bore in the other of the two parts of the internal shaft and the bolt has a smaller diameter than the bore.

3. The bicycle crank system of claim 2, wherein said other of the two parts slides radially relative to the bolt and relative to said one of the two parts, when the bolt is tightened into the internal shaft.

4. A bicycle crank system comprising:
  an external shaft rotatably supported in a bicycle bottom bracket so that the external shaft rotates on its axis relative to the bicycle bottom bracket;
  a chain sprocket for holding a bicycle chain, the chain sprocket being coaxial with and fixedly attached to said external shaft so that the chain sprocket rotates with the external shaft; and
  an internal shaft disposed within the external shaft and holding right and left crank arms, wherein the internal shaft is fixedly anchored to the external shaft so that the internal shaft rotates with the external shaft and the chain sprocket; and
  wherein the internal shaft is removable from the external shaft without disruption of the chain sprocket and bicycle chain to remove the right and left crank arms from the bicycle.

5. The bicycle crank system of claim 4 wherein said bicycle crank system further comprises a right and left stop on said external shaft for retaining, and limiting movement, of the chain sprocket on the external shaft.

6. The bicycle crank system of claim 5 wherein said external shaft comprises an end with threads and a radially-protruding flange that is said right stop, and said left stop comprises a threaded system cooperating with the threads on the external shaft end and tightened against the chain sprocket.

7. The bicycle crank system of claim 6, wherein said threaded system comprises a washer and an internally-threaded drive side member, wherein the washer is adjacent the chain sprocket and the internally-threaded drive side member is tightened against the washer so that said chain sprocket is retained on the external shaft between said radially-protruding flange and said washer.

8. The bicycle crank system of claim 4 comprising a connection between one of the right and left crank arms and the chain sprocket, wherein said connection is an indicator pin extending from said one of the right and left crank arms and sliding freely into a receiving aperture in said chain sprocket so that the indicator pin slides freely out of the right and left crank arms from the bicycle.

9. The bicycle crank system according to claim 4, wherein the internal shaft comprises two portions inserted into two opposite ends of the external shaft, wherein said two portions extend from their respective two opposite ends of the external shaft to midway along the axis of the external shaft, and wherein said two portions each have an internal bore, and the internal shaft further comprising a fastner extending into and connecting said internals bores of the two portions to connect said two portions together.

10. The bicycle crank system according to claim 8, wherein said fastner is externally threaded on one end, wherein said fastner extends through the internal bore of one of said two portions and threadably fastens to threads in the internal bore of the other of said two portions.

11. The bicycle crank system comprising a shaft-within-a-shaft system comprising:
  an external shaft rotatably supported in bearings of a bicycle bottom bracket and having a threaded end;
  a chain sprocket coaxial with and fixed to the threaded end of the external shaft by a fixed connection so that said external shaft and chain sprocket rotate together releative to the bicycle bottom bracket, the fixed connection comprising a flange extending radially from the end of the external shaft on a right side of the chain sprocket and a threaded system cooperating with the threaded end and tightened against a left side of the chain sprocket;
  an internal shaft secured within and generally coaxial with the external shaft so that the internal shaft rotates with the external shaft and chain sprocket;
  right and left crank arms connected to two ends of the internal shaft;
  wherein the right and left crank arms, powered by a rider of the bicycle, rotate the internal shaft to rotate the external shaft fixed to the internal shaft and the chain sprocket fixed to the external shaft;
  wherein the internal shaft comprises a plurality of parts that are detachable from each other upon removal of a fastner accessible from outside the external shaft, wherein the internal shaft parts detach from each other to slide out from the external shaft for removal of the crank arms from the bicycle, and wherein the external shaft and the chain sprocket remain in the bicycle without being disrupted by the removal of the internal shaft and right and left crank arms.

12. A bicycle crank system as in claim 11 comprising a slidable connection between the right crank arm and the chain sprocket, the slidable connection comprising an indicator pin extending from said right crank arm and slidably received in a receiving aperture in said chain sprocket so that the right crank arm further powers the chain sprocket by means of the indicator pin, and wherein the indicator pin slides freely out of the sprocket when said internal shaft is removed from the external shaft to remove said right and left crank arms from the bicycle.

* * * * *